G. Wood,
Camp Kit,
Nº 32,328.  Patented May 14, 1861.
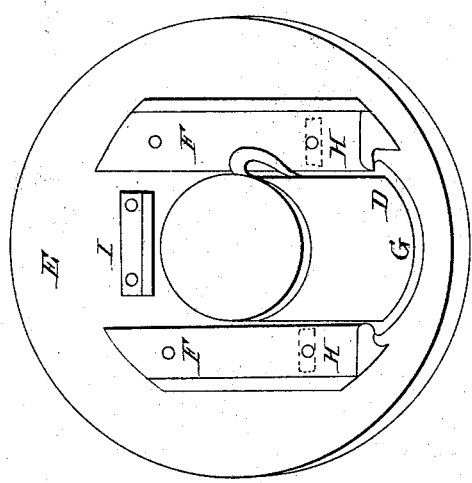
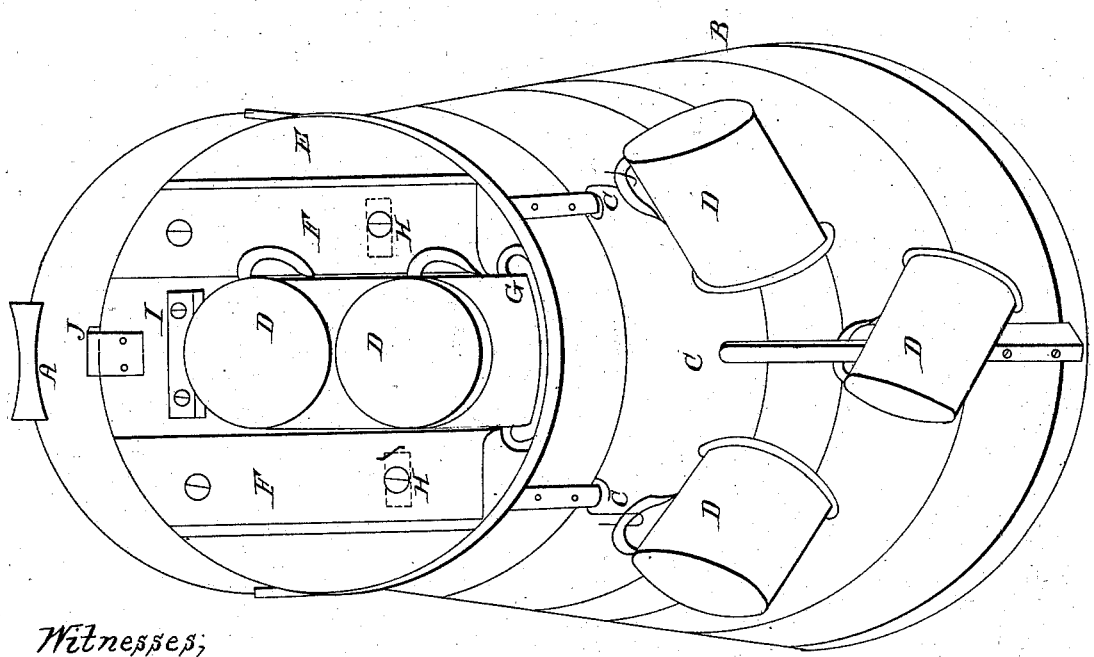
Witnesses;
J. H. Maynard
Isaac Walker
Inventor;
George Wood

UNITED STATES PATENT OFFICE.

GEORGE WOOD, OF STRASBURG, PENNSYLVANIA.

FIELD-BUCKET.

Specification of Letters Patent No. 32,328, dated May 14, 1861.

*To all whom it may concern:*

Be it known that I, GEORGE WOOD, of Strasburg, Lancaster county, State of Pennsylvania, have invented an Improvement in Cans for Carrying Water, called Field-Buckets; and I do hereby declare that the following is a full and exact description thereof, reference being had to the accompanying drawings, and to the letters of reference marked thereon, making a part of this specification.

The nature of my invention consists in adjustable holders with grooves, on the top and inner side of lid, in which a number of tin cups slide and are held fast.

To enable others skilled in the art to make and use my invention I will proceed to describe its construction and operation.

A represents the handle; B the can or bucket.

C, are the hooks on the outside of bucket upon which tin cups D are suspended.

E represents the lid at top of bucket, upon which are fastened (with screws) four adjustable grooved bars or holders F that extend across the top and lower side of lid; two above and two on the underside.

The flanges G of the bottoms of the tin cups slide in the grooves of the holders F so that the lid will carry a half dozen of cups, three cups on top, and three cups on the underside of lid, and a number of tin cups may be suspended to the sides on the hooks.

Two of the screws that fasten the holders F operate in slots H, the slots being in the lid E, for the purpose of widening or narrowing the holders, to allow the cups to slide in the grooves easily, and then the holders are moved against them to tighten the cups in their places.

I is a guard to prevent the cups from being pushed off through the opposite ends of grooved holders.

J represents the hinge of lid.

The advantage of this invention, is to save much time consumed by men working in the harvest field, mines or quarries, when thirsty. The bucket is usually carried to the field with one cup; but by this invention ten or fifteen persons can each have their own cup, and all of them drink at the same time.

What I claim as my invention, and desire to secure by Letters Patent is—

The lid E, with slots H, in combination with the grooved adjustable bars F extending across the upper and lower sides of the lid, for the purposes herein set forth.

GEORGE WOOD.

Witnesses:
JNO. FRANKLIN REIGART,
WM. T. WYLIE.